US009148626B2

(12) United States Patent
Kao et al.

(10) Patent No.: US 9,148,626 B2
(45) Date of Patent: Sep. 29, 2015

(54) COMPUTING DEVICE AND METHOD FOR ADJUSTING VIDEO IMAGE

(71) Applicants:GDS Software (ShenZhen) Co.,Ltd, Shenzhen (CN); HON HAI PRECISION INDUSTRY CO., LTD., New Taipei (TW)

(72) Inventors: Ming-Chuan Kao, New Taipei (TW); Sen-Cai Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 134 days.

(21) Appl. No.: 13/965,235

(22) Filed: Aug. 13, 2013

(65) Prior Publication Data

US 2014/0218462 A1 Aug. 7, 2014

(30) Foreign Application Priority Data

Feb. 4, 2013 (CN) .......................... 2013 1 00423868

(51) Int. Cl.
*H04N 7/15* (2006.01)
(52) U.S. Cl.
CPC . *H04N 7/15* (2013.01); *H04N 7/152* (2013.01)

(58) Field of Classification Search
CPC ......... H04N 7/15; H04N 7/147; H04N 7/152; H04L 65/403; H04M 3/567
USPC ...................... 348/14.01–14.16; 715/753–756
See application file for complete search history.

(56) References Cited

U.S. PATENT DOCUMENTS

| 2004/0257433 | A1* | 12/2004 | Lia et al. .................... 348/14.09 |
| 2005/0188321 | A1* | 8/2005 | Adams et al. ................. 715/759 |
| 2008/0091778 | A1* | 4/2008 | Ivashin et al. ................. 709/204 |
| 2008/0136899 | A1* | 6/2008 | Eisenberg et al. .......... 348/14.09 |
| 2010/0085419 | A1* | 4/2010 | Goyal et al. ............... 348/14.09 |
| 2014/0267572 | A1* | 9/2014 | Bright-Thomas .......... 348/14.09 |

\* cited by examiner

*Primary Examiner* — Stella L Woo
(74) *Attorney, Agent, or Firm* — Novak Druce Connolly Bove + Quigg LLP

(57) ABSTRACT

A computing device is electronically connected to one or more clients for a video conference. The computing device firstly sends a first video image to the clients. When a client requests a custom video image, the computing device obtains a second video image by merging images of all conference participants for the client, and sends to the client. The client selects information from the second video image and sends the information to the computing device. After receiving the information, the computing device creates the custom video image according to the received information, and sends the custom video image to the client.

18 Claims, 5 Drawing Sheets

COMPUTING DEVICE AND METHOD FOR ADJUSTING VIDEO IMAGE

BACKGROUND

1. Technical Field

Embodiments of the present disclosure relate to video technology, and more particularly to a computing device and a method for adjusting video images.

2. Description of Related Art

Current conference video servers cannot display all conference participants images if a number of the conference participants is over a predetermined value. On one hand, when the number of the conference participants reaches the predetermined value, a conference video server only can display images of a part of conference participants on screens of clients. On another hand, the conference participants images displayed on the screens are same. That is, the clients cannot select one or more conference participants images according to their own needs.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable storage medium or other computer storage device.

Figure 1:
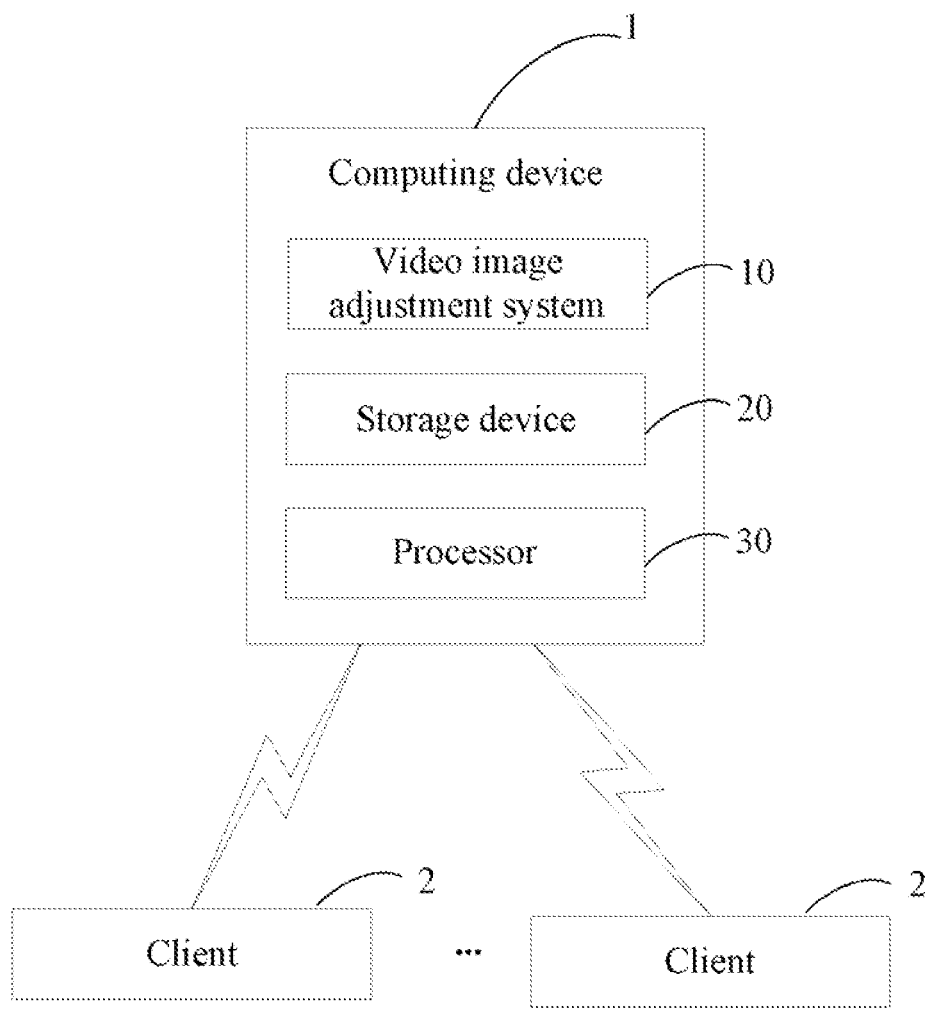
FIG. 1 is a block diagram of one embodiment of a computing device including a video image adjustment system.

FIG. 1 is a block diagram of one embodiment of a computing device 1. In one embodiment, the computing device 1 includes a video image adjustment system 10 (hereinafter "the system 10"), a storage device 20 and a processor 30. The computing device 1 may be configured in a number of other ways in other embodiments and may include other or different components from those shown in FIG. 1. The computing device 1 is connected to one or more clients 2 via a network. The client 2 may be a server, a computer, a telephone or a personal digital assistant (PDA), for example. The computing device 1 may be a server or a computer. The network may be the Internet, wireless networks (e.g., WIFI) or other communication networks. In one embodiment, information transmittal between the computing device 1 and the clients 2 is via voice over internet protocol (VOIP). When a client 2 calls the computing device 1 via the VOIP to request the computing device 1 for a video image, an IP address of the client 2 is included in the VOIP. The computing device 1 can determine which client 2 requests the video image according to the IP address, and sends the video image to the client 2 via VOIP.

Figure 2:
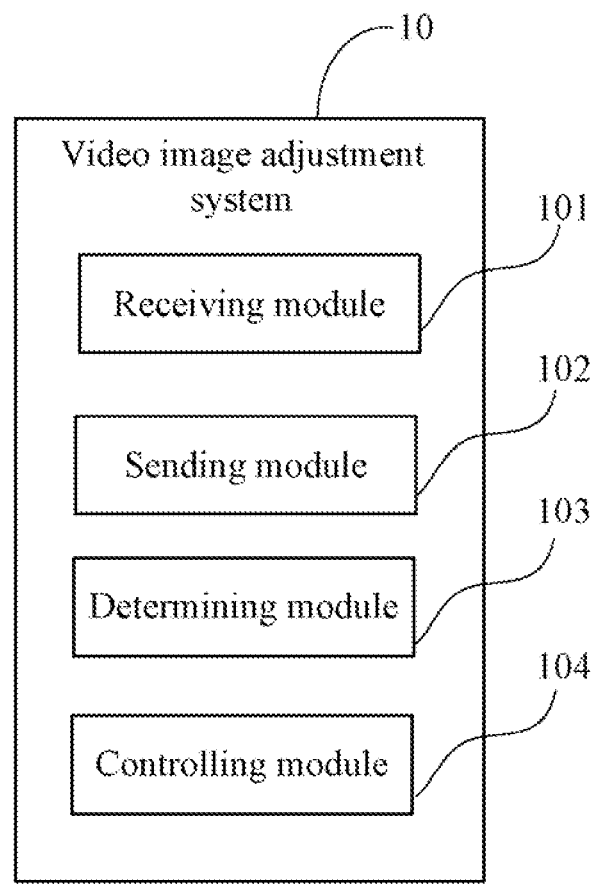
FIG. 2 is a block diagram of one embodiment of function modules of the video image adjustment system in the computing device of FIG. 1.

FIG. 2 is a block diagram of one embodiment of function modules of the system 10. In one embodiment, the system 10 may include a receiving module 101, a sending module 102, a determining module 103, and a controlling module 104. A detailed description of the function modules 101-104 is given in reference to FIG. 3. The function modules 101-104 may include computerized codes in the form of one or more programs, which are stored in the storage device 20. The processor 30 executes the computerized codes, to provide functions of the function modules 101-104.

Figure 3:
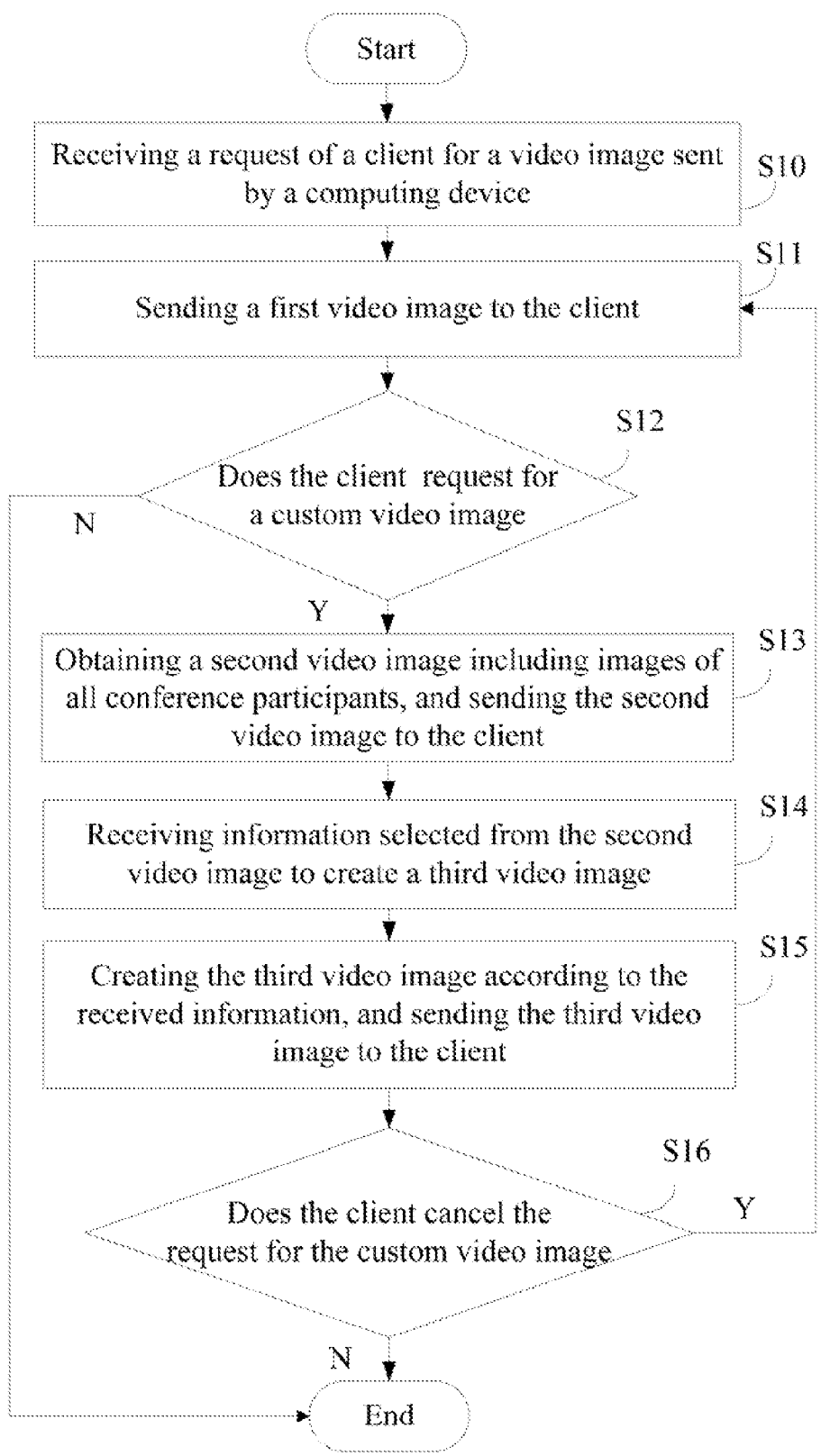
FIG. 3 illustrates a flowchart of one embodiment of a method of adjusting a video image in the computing device of FIG. 1.

FIG. 3 illustrates a flowchart of one embodiment of a method for adjusting a video image in the computing device 1 of FIG. 1. Depending on the embodiment, additional steps may be added to FIG. 3, others removed, and the ordering of the steps in FIG. 3 may be changed.

In step S10, the receiving module 101 receives a request sent from a client 2 for requesting the computing device 1 to send a video image of a conference.

In step S11, the sending module 102 sends a first video image to the client 2 via VOIP. The first video image, which is predetermined by a chairman of the conference, is a master video image. The first video image may do not include all conference participants of the conference.

In step S12, the determining module 103 determines whether the client 2 requests a custom video image according to a selection of the client 2. A option is provided to the client 2 to select one. The option includes requesting the custom video image and not requesting the custom video image. In one embodiment, the custom video image is displayed for the client 2. The custom video image includes images of one or more conference participants of the conference. The images of the one or more conference participants are selected by the client 2. If the selection is requesting the custom video image, the determining module 103 determines the client 2 requests the custom video image, the step S13 is implemented. Otherwise, if the selection is not requesting the custom video image, the determining module 103 determines the client 2 does not request for the custom video image, the procedure ends.

In step S13, the controlling module 104 obtains a second video image by merging images of all conference participants, and sends the second video image to the client 2.

In one embodiment, first, the controlling module 104 detects a number of the conference participants. An output resolution of the second video image is determined according to the number of the conference participants and a predetermined rule. An output size of the second video image is determined according to the output resolution of the second video image. The predetermined rule is that, when the number of the conference participants is not more than four, the output resolution of the second video image is 352 pixels×288 pixels, and when the number of conference participants is more than four and not more than eight, the output resolution of the second video image is (352×2) pixels×(288×2) pixels, that is 704 pixels×576 pixels, and so on. Therefore, the output resolution of the second video image is dynamically changed according to the number of the conference participants.

In step S14, the receiving module 101 receives information selected from the second video image to create a third video image. In one embodiment, the third video image is a kind of the custom video image. The information includes images of one or more conference participants, which are in sequence selected by the client 2 in the second video image, and a layout in relation to the selected images, such as 2×2, 3×3, . . . , n×n.

In step S15, the controlling module 104 creates the third video image according to the received information, and sends the third video image to the client 2.

In detail, according to a layout of n×n of the third video image included in the information, the controlling module 104 creates a two-dimensional array with n rows and n columns to store the third video image, where n is a positive integer. The third video image includes images of the conference participants, which are in sequence selected by the client 2 from the second video image. A number of images of the conference participants may be less than n-squared. The conference participant images are stored in the two-dimensional array. Each element of the two-dimensional array stores an image of one conference participant. Each element includes H/n pixels×L/n pixels when a predetermined size of the third video image is H pixels×L pixels. For example, an image of a first conference participant selected by the client 2 is stored in a first row and a first column of the two-dimensional array, an image of a second conference participant image selected by the client 2 is stored in the first row and a second column of the two-dimensional array. Therefore, the controlling module 104 merges the images of the conference participants selected by the client 2 to obtain the third video image according to a position of each conference participant image in the two-dimensional array. The third video image sent to the client 2 is changed when the position of each conference participant image changes.

Figure 4:
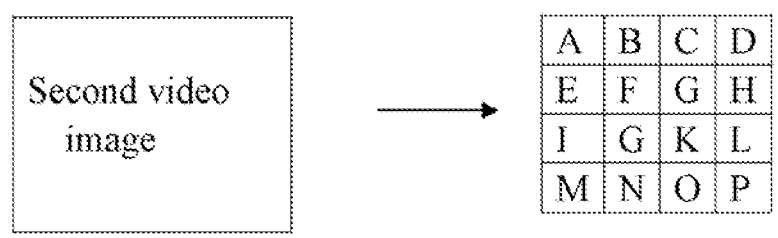
FIG. 4 is a schematic diagram of one embodiment of a method of obtaining a third video image according to a second video image in the computing device of FIG. 1.

FIG. 4 is a schematic diagram of one embodiment of a method of obtaining third video image based on a second video image. The client 2 in sequence selects sixteen images of the conference participants from the second video image, such as A, B, C, D, . . . , P. The third video image, as shown in FIG. 4, displays all the sixteen images of the conference participants. A layout of the third video image is 4×4 as shown in FIG. 4, and a size of the third video image is 704 pixels×576 pixels. First, the controlling module 104 creates a two-dimensional array TT with four rows and four columns. Then an image of a first conference participant A is stored in the first row and the first column of TT, an image of a fifth conference participant E is stored in the second row and the first column of TT, and an image of the 16th conference participant P is stored in the fourth row and the fourth column of TT.

Figure 5:
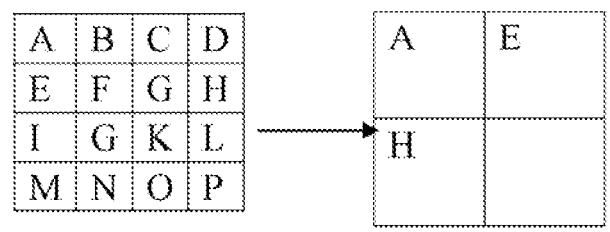
FIG. 5 is a schematic diagram of one embodiment of a method of obtaining a new video image according to a third video image in the computing device of FIG. 1.

In another embodiment, a new video image with a layout of m×m can be obtained from the third video image with the layout of n×n, where m is a positive integer and is less than n. The new video image is another kind of the custom video image. A size of the new video image is the same as a size of the third video image. For example, if the size of the third video image is H pixels×L pixels, the size of the new video image is H pixels×L pixels. As shown in FIG. 5, the size of the third video image is 704 pixels×576 pixels, and the layout of the third video image is 4×4. The third video image is adjusted to obtain the new video image. The size of the new video image is 704 pixels×576 pixels, and the layout of the new video image is 2×2. The new video image includes images of three conference participants, which are in sequence selected from the third video image by the client 2, such as A, E, and H. The new video image is stored in a two-dimensional array with two rows and two columns. An image of the conference participant A is stored in a first row and a first column of the two-dimensional array, an image of the conference participant E is stored in the first row and a second column of the two-dimensional array, and an image of the conference participant H is stored in a second row and a first column of the two-dimensional array.

In step S16, the determining module 103 determines whether the client 2 cancels the request for the custom video image. If the client 2 cancels the request for the custom video image, the procedure returns to the step S11. If the client 2 does not cancel the request for the custom video image, the procedure ends.

It should be emphasized that the above-described embodiments of the present disclosure, including any particular embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

What is claimed is:

1. A computerized method being executed by at least one processor of a computing device, the method comprising:
   receiving a request sent from a client for requesting a video image by a computing device;
   sending a first video image to the client;
   obtaining a second video image by merging images of all conference participants, and sending the second video image to the client on condition that the client requests a custom video image;
   receiving information selected from the second video image to create the custom video image; and
   creating the custom video image according to the received information, and sending the custom video image to the client.

2. The method according to claim 1, further comprising:
   determining whether the client cancels the request for the custom video image; and
   sending the first video image to the client in a response to a determination that the client cancels the request for the custom video image.

3. The method according to claim 1, wherein communications between the computing device and the clients is via a voice over internet protocol(VOIP).

4. The method according to claim 1, wherein an output resolution of the second video image dynamically changes according to a number of the conference participants.

5. The method according to claim 1, wherein the information comprises images of one or more conference participants, which are in sequence selected from the second video image by the client and a layout in relation to the selected images.

6. The method according to claim 5, wherein according to the layout of n×n of the custom video image, a two-dimensional array with n rows and n columns is created to store the custom video image, n is a positive integer, and the images are in sequence stored in the two-dimensional array.

7. A computing device, comprising:
   a processor; and
   a storage device that stores one or more programs, when executed by the at least one processor, causing the at least one processor to perform a video image adjustment method, the method comprising:
   receiving a request sent from a client for requesting a video image by a computing device;

sending a first video image to the client;
obtaining a second video image by merging images of all conference participants, and sending the second video image to the client on condition that the client requests a custom video image;
receiving information selected from the second video image to create the custom video image; and
creating the custom video image according to the received information, and sending the custom video image to the client.

8. The computing device according to claim 7, wherein the one or more programs further cause the processor to perform a video image adjustment method, the method further comprising:
determining whether the client cancels the request for the custom video image; and sending the first video image to the client in a response to a determination that the client cancels the request for the custom video image.

9. The computing device according to claim 7, wherein communications between the computing device and the clients is via a voice over internet protocol (VOIP).

10. The computing device according to claim 7, wherein an output resolution of the second video image dynamically changes according to a number of the conference participants.

11. The electronic device according to claim 7, wherein the information comprises images of one or more conference participants, which are in sequence selected from the second video image by the client and a layout in relation to the selected images.

12. The computing device according to claim 11, according to the layout of n×n of the custom video image, a two-dimensional array with n rows and n columns is created to store the custom video image, n is a positive integer, and the images are in sequence stored in the two-dimensional array.

13. A non-transitory storage medium having stored thereon instructions that, when executed by a processor of a computing device, causes the processor to video image adjustment method in the computing device, wherein the method comprises:
receiving a request sent from a client for requesting a video image by a computing device;
sending a first video image to the client;
obtaining a second video image by merging images of all conference participants, and sending the second video image to the client on condition that the client requests a custom video image;
receiving information selected from the second video image to create the custom video image; and
creating the custom video image according to the received information, and sending the custom video image to the client.

14. The non-transitory storage medium according to claim 13, the method further comprises:
determining whether the client cancels the request for the custom video image; and sending the first video image to the client in a response to a determination that the client cancels the request for the custom video image.

15. The non-transitory storage medium according to claim 13, wherein communications between the computing device and the clients is via a voice over internet protocol(VOIP).

16. The non-transitory storage medium according to claim 13, wherein an output resolution of the second video image dynamically changes according to a number of the conference participants.

17. The non-transitory storage medium according to claim 13, wherein the information comprises images of one or more conference participants, which are in sequence selected from the second video image by the client and a layout in relation to the selected images.

18. The non-transitory storage medium according to claim 17, wherein according to the layout of n×n of the custom video image, a two-dimensional array with n rows and n columns is created to store the custom video image, n is a positive integer, and the images are in sequence stored in the two-dimensional array.

* * * * *